(12) United States Patent
Na et al.

(10) Patent No.: US 11,245,450 B2
(45) Date of Patent: Feb. 8, 2022

(54) REFERENCE SIGNAL TRANSMISSION METHOD, CHANNEL STATE INFORMATION FEEDBACK METHOD, BASE STATION AND MOBILE STATION

(71) Applicant: NTT DOCOMO, INC., Tokyo (JP)

(72) Inventors: Chongning Na, Beijing (CN); Huiling Jiang, Beijing (CN); Yuichi Kakishima, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 247 days.

(21) Appl. No.: 16/089,098

(22) PCT Filed: Mar. 30, 2017

(86) PCT No.: PCT/CN2017/078734
§ 371 (c)(1),
(2) Date: Sep. 27, 2018

(87) PCT Pub. No.: WO2017/167216
PCT Pub. Date: Oct. 5, 2017

(65) Prior Publication Data
US 2020/0304190 A1    Sep. 24, 2020

(30) Foreign Application Priority Data

Mar. 31, 2016 (CN) .......................... 201610200518.9

(51) Int. Cl.
*H04B 7/06* (2006.01)
*H04B 7/0417* (2017.01)

(52) U.S. Cl.
CPC ......... *H04B 7/0626* (2013.01); *H04B 7/0417* (2013.01); *H04B 7/0617* (2013.01); *H04B 7/0695* (2013.01)

(58) Field of Classification Search
None
See application file for complete search history.

(56) References Cited

U.S. PATENT DOCUMENTS

| | | | |
|---|---|---|---|
| 10,110,290 B2 * | 10/2018 | Kim | H04B 7/0636 |
| 2014/0177745 A1 * | 6/2014 | Krishnamurthy | H04B 7/0413 |
| | | | 375/267 |
| 2016/0373178 A1 * | 12/2016 | Nam | H04B 7/0639 |

FOREIGN PATENT DOCUMENTS

CN    105322989 A    2/2016

OTHER PUBLICATIONS

International Search Report issued for PCT/CN2017/078734, dated Jun. 7, 2017 (5 pages).

(Continued)

*Primary Examiner* — Adolf Dsouza
(74) *Attorney, Agent, or Firm* — Osha Bergman Watanabe & Burton LLP

(57) ABSTRACT

A terminal is disclosed that includes a processor that performs channel measurement based on a first Channel State Information-Reference Signal (CSI-RS) and performs channel measurement based on a second CSI-RS; and a transmission section that transmits a first Channel State Information (CSI) feedback based on the first CSI-RS and a second CSI feedback based on the second CSI-RS. Additionally, when the first CSI-RS is an un-precoded CSI-RS, the first CSI feedback only includes a part of information of CSI feedback based on the un-precoded CSI-RS that is a precoding matrix indicator (PMI) or are the PMI and a rank indicator (RI). In another aspect, a CSI feedback method for a terminal is also disclosed.

6 Claims, 5 Drawing Sheets

(56) References Cited

OTHER PUBLICATIONS

Written Opinion issued for PCT/CN2017/078734, dated Jun. 7, 2017 (9 pages).

\* cited by examiner

REFERENCE SIGNAL TRANSMISSION METHOD, CHANNEL STATE INFORMATION FEEDBACK METHOD, BASE STATION AND MOBILE STATION

TECHNICAL FIELD

The present invention relates to the field of radio communication, and, more particularly, to a channel state information reference signal transmission method, a channel state information feedback method, a base station and a mobile station that can be used in a radio communication system.

BACKGROUND ART

In successor systems of the LTE system (also referred to as, for example, "LTE-Advanced" or "LTE-Advanced Pro"), it is becoming increasingly important that a user terminal measure spatial characteristics of channels and feed back measurement results to a radio base station in the form of channel state information (CSI). In successor systems of LTE (for example, Rel. 10), a proposal has been made to use channel state information reference signals (CSI-RSs) as reference signal for measuring channel state information (CSI). To be more specific, a base station transmits CSI-RSs for use for a mobile station, to the mobile station, in specific time/frequency resources, in a predetermined cycle. By this means, the mobile station can measure CSI based on the CSI-RSs, and return the measurement results.

Meanwhile, full-dimension multi-input multi-output (FD-MIMO) and massive multi-input multi-output (massive MIMO) antennas are wireless communication technologies that have been proposed in LTE (Long Term Evolution) Release 13, studied in 3GPP (3rd Generation Partnership Project). Compared to conventional MIMO systems, in FD-MIMO and massive MIMO systems, a base station can communicate data using more antennas, so that the throughput of the system improves when the data for mobile stations increases. However, as the number of antennas increases, the overhead of control signaling required by CSI-RSs also increases. Therefore, the current CSI-RS transmission method cannot be applied to the FD-MIMO system and the massive MIMO system.

SUMMARY OF INVENTION

One aspect of the present invention provides a transmission method for a base station transmitting a channel state information reference signal (CSI-RS), and this method includes transmitting a first CSI-RS relating to a first antenna port of the base station to a mobile station, forming a second antenna port that is beamformed based on a first CSI feedback received from the mobile station, transmitting a second CSI-RS relating to the second antenna port to the mobile station, and selecting a beam for data transmission to the mobile station, based on a second CSI feedback received from the mobile station.

Another aspect of the present invention provides a channel state information (CSI) feedback method for a mobile station, and this method includes generating a first CSI feedback by performing initial channel detection based on a first channel state information reference signal (CSI-RS) relating a first antenna port of a base station received from the base station, and transmitting the first CSI feedback to the base station so that the base station forms a second antenna port that is beamformed based on the first CSI feedback, and generating a second CSI feedback by performing channel detection again based on a second CSI-RS relating the second antenna port received from the base station, and transmitting the second CSI feedback to the base station so that the base station selects a beam for data transmission to the mobile station based on the second CSI feedback.

Another aspect of the present invention provides a base station, and this base station has a transmission section that transmits a first channel state information reference signal (CSI-RS) relating to a first antenna port and a second CSI-RS relating to a second antenna port of the base station to a mobile station, and a beamforming section that forms a second antenna port that is beamformed based on a first CSI feedback received from the mobile station, and a beam selection section that selects a beam for the mobile station based on a second CSI feedback received from the mobile station.

Another aspect of the present invention provides a mobile station, and this mobile station includes a first CSI feedback section that generates a first CSI feedback by performing initial channel detection based on a first channel state information reference signal (CSI-RS) relating to a first antenna port of a base station received from the base station, and a transmission section that transmits the first CSI feedback to the base station so that the base station forms a second antenna port that is beamformed based on the first CSI feedback, and a second CSI feedback section that generates a second CSI feedback by performing channel detection again based on a second CSI-RS relating to the second antenna port received from the base station, wherein the transmission section transmits the second CSI feedback to the base station so that the base station selects a beam for the mobile station based on the second CSI feedback.

CSI-RSs are transmitted and CSI is fed back based on a multi-step scheme, using the above-described reference signal transmission method, channel state information feedback method, base station and mobile station according to the above-described aspects of the present invention. This allows the radio communication system to minimize the increase in control signaling overhead as much as possible, and to support the use of massive MIMO or FD-MIMO.

BRIEF DESCRIPTION OF DRAWINGS

The above and other objects, features and advantages of the present invention will become more clear by describing in detail embodiments of the present invention with reference to the accompanying drawings.

DESCRIPTION OF EMBODIMENTS

Figure 1:
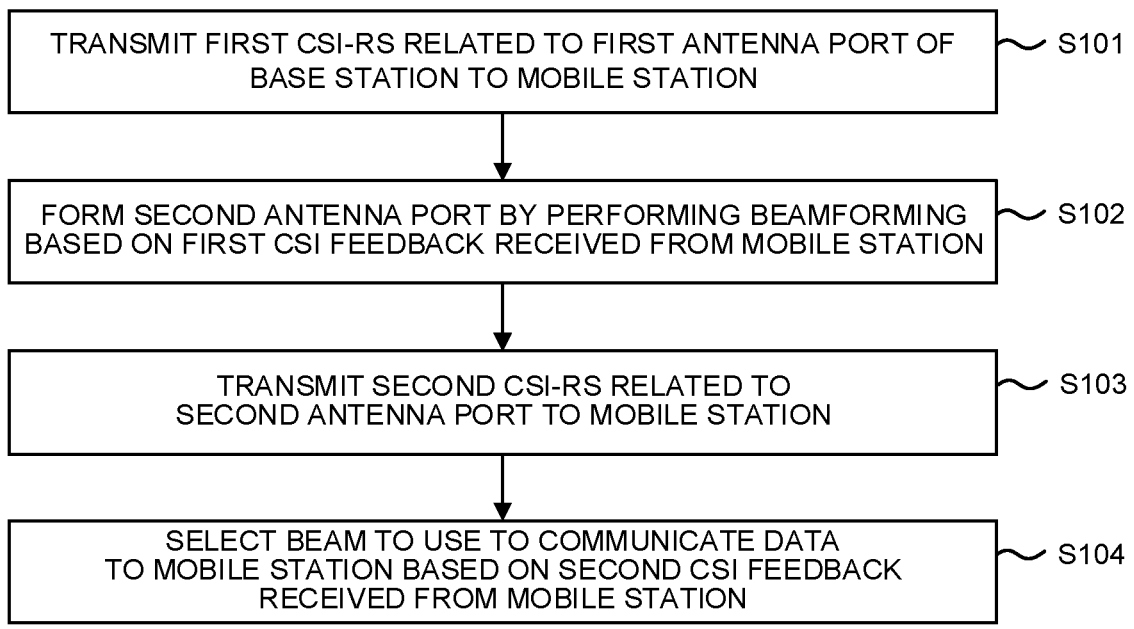
FIG. 1 is a flowchart to show a method of transmitting channel state information reference signals (CSI-RSs), which is executed by a base station.

Now, with reference to the accompanying drawings, the channel state information reference signal (CSI-RS) transmission method, the channel state information (CSI) feedback method, a base station, and a mobile station according to an embodiment of the present invention will be described below. Throughout the accompanying drawings, the same reference numerals refer to the same elements. However, the embodiment described herein is only illustrative, and should not be construed to limit the scope of the present invention. Also, UEs as described herein may include a variety of types of user terminals, including, for example, mobile terminals (also referred to as "mobile stations"), stationary terminals and so on. Also, in the following description, UEs and mobile stations may be used interchangeably for ease of explanation.

A base station can transmit configuration information related to antenna ports, beams, time and frequency resources and so on that are used to communicate CSI-RSs, to a mobile station, via RRC signaling, statically or semi-statically. Then, in accordance with the indications of the configuration information, the base station transmits CSI-RSs to the mobile station, and the mobile station performs measurements based on the CSI-RSs and feeds back CSI to the base station based on the measurements. CSI-RSs to support multi-antenna ports have already been proposed. To be more specific, the CSI process for making measurements by using CSI-RSs related to antenna ports where precoding is not executed, and feeding back the measurement results (hereinafter referred to as the "CSI process where precoding is not applied"), and the CSI process for making measurements by using CSI-RSs related to antenna ports where beamforming is executed, and feeding back the measurement results (hereinafter referred to as the "CSI process where beamforming is applied") have been proposed.

In the CSI process where precoding is not applied, a base station transmits CSI-RSs corresponding to all the un-precoded antenna ports in this base station, to a mobile station, so that the mobile station can make channel measurements. For example, a base station that is compatible with massive MIMO can have eight antenna ports for use for CSI-RS measurements. The base station transmits CSI-RSs corresponding to all the un-precoded antenna ports, which are used for CSI-RS measurements, to the mobile station. The mobile station performs measurements on un-precoded CSI-RSs, and transmits a CSI report of class A to the base station based on the measurement results.

Meanwhile, in the CSI process where beamforming is applied, the base station applies beamforming to each un-precoded antenna port, so that antenna ports that have been subjected to beamforming are formed, and the base station transmits CSI-RSs corresponding to all the antenna ports that have been subjected to beamforming and formed thus, to the mobile station, so that the mobile station can perform channel measurements. For example, if the base station is compatible with massive MIMO, eight un-precoded antenna ports for use for CSI-RS measurements can be included. The base station applies beamforming to all of the un-precoded antenna ports for use for CSI-RS measurements, thereby forming sixty-four antenna ports that have been subjected to beamforming, and transmits CSI-RSs related to these sixty-four antenna ports where beamforming has been applied, to the mobile station. The mobile station performs measurements on the CSI-RSs that have been subjected to beamforming, and transmits a CSI report of class B, to the base station, based on the measurement results.

That is, the overhead of required signaling increases significantly following the increase in the number of antenna ports, in both the CSI process where precoding is not applied and the CSI process where beamforming is applied. Therefore, the CSI processes cannot be applied to the FD-MIMO system and the massive MIMO system.

Embodiments of the present invention improve CSI-RSs and CSI feedback in CSI processes. Now, an embodiment of the present invention will be described below with reference to the accompanying drawings.

Now, with reference to FIG. 1, the method of transmitting channel state information reference signals (CSI-RSs), executed by a base station, according to an embodiment of the present invention, will be described below. FIG. 1 shows a flowchart of a CSI-RS transmission method 100. As shown in FIG. 1, in step S 101, a base station transmits first CSI-RSs, which relate to first antenna ports of the base station, to a mobile station. The first antenna ports may be part of the un-precoded antenna ports for use for CSI measurements, or may be ports that have been subjected to beamforming, which are provided by applying beamforming to part of the ports for use for CSI measurements and that are not precoded. In other words, in step S101, the base station transmits CSI-RSs related to part of the antenna ports to a mobile station, so that the mobile station performs initial channel measurements based on the CSI-RSs of these partial antenna ports and transmits first CSI feedback to the base station to show the initial channel measurement results.

In step S102, the base station performs beamforming based on the first CSI feedback received from the mobile station, and forms second antenna ports that have been subjected to beamforming. As mentioned earlier, the first CSI feedback shows the results of the initial measurements of channel states in the mobile station. For example, the first CSI feedback may include selecting an initial precoding matrix (that is, a precoding matrix indicator (PMI)) or selecting an initial beam (that is, a channel resource indicator (CRI)), determined by the mobile station based on the first CSI-RSs.

After the first CSI feedback is received, the base station performs beamforming for all of its antenna ports that are not precoded and that are used for CSI measurements, on an as-needed basis, based on the first CSI feedback, so that a simplified antenna port array is provided. To be more specific, in the beamforming process of step S102, the base station can map a number of un-precoded ports to one port. Here, the percentage of un-precoded ports in the mapping ports can be specified by the first CSI feedback. For example, in the beamforming process, each un-precoded port's mapping weight can be derived based on the first CSI feedback received. Then, based on these mapping weights, multiple un-precoded antenna ports may be mapped to a single second antenna port.

Furthermore, according to an example of the present invention, the base station can store a plurality of sets of mapping weight in advance. In step S102, first, a set of mapping weights can be specified based on the first CSI feedback received. Then, mapping weights are picked up from the mapping weight set. For example, the base station can identify a particular set of mapping weights from the weight sets that are stored, based on the first CSI feedback received, and, when the base station forms each second antenna port, the base station can use the mapping weights selected from this mapping weight set together. Also, for example, the base station can pick a number of specific mapping weight sets from the weight sets that are stored, based on the first CSI feedback received, and assign a different set to each second antenna port, amongst the plurality of specific mapping weight sets. When the base station forms each second antenna port, the base station can use mapping weights selected from the mapping weight set assigned to this port.

Next, in step S103, a base station transmits second CSI-RSs, which relate to the second antenna ports, to the mobile station. In other words, second CSI-RSs are transmitted to the mobile station via a simplified antenna port array where beamforming has been performed. Finally, in step S104, based on second CSI feedback received from the mobile station, the beam to use for the mobile station is selected.

Now, a specific example of the CSI-RS transmission method 100 will be described below with reference to FIG. 2 to FIG. 6.

Figure 2:
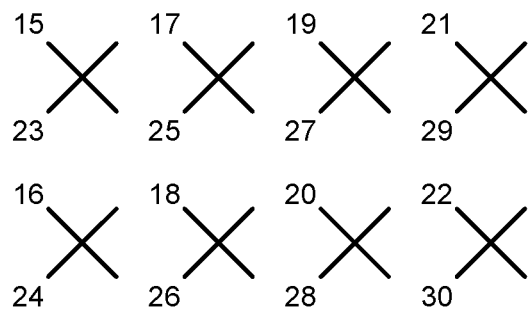
FIG. 2 is a schematic diagram to show an un-precoded antenna port array, included in a base station.

FIG. 2 is a schematic diagram to show an un-precoded antenna port array, included in a base station 200. As shown in FIG. 2, the base station 200 includes a massive MIMO antenna array, and this massive MIMO antenna array is comprised of un-precoded antenna ports 15 to 30, which are arranged in a horizontal dimension x and a vertical dimension y and used for CSI measurements.

According to a first example of the present invention, first antenna ports may be part of the antenna ports of the base station that are not precoded. Furthermore, part of the ports among the un-precoded antenna ports may be a number of ports located in the same spatial dimension. In step S101, first CSI-RSs can be transmitted to the mobile station using part of the antenna ports that are not precoded. The mobile station performs initial channel measurements based on the first CSI-RSs that are transmitted from a plurality of ports that are provided in the same spatial dimension, so that the mobile station can identify the channel states in this spatial dimension and generate first CSI feedback. In step S102, based on the first CSI feedback, it is possible to apply beamforming to all of the antenna ports that are not precoded and that are used for CSI measurements, so that un-precoded antenna ports are mapped to second antenna ports, and a simplified antenna port array is formed. When forming each second antenna port, mapping weights that are picked from the same mapping weight set can be used. In step S103, second CSI-RSs can be transmitted via a simplified antenna port array (that is, second antenna ports). The mobile station can generate second CSI feedback by measuring channel states in a different spatial dimension than the initial channel measurements, based on the second CSI-RSs. In step S104, based on the second CSI feedback received from the mobile station, the base station can finally determine the beam to use for the mobile station.

For example, in the example shown in FIG. 2, in step S101, first CSI-RS can be transmitted to the mobile station, from ports 15 and 16 arranged along the vertical dimension y. The mobile station can acquire the channel states in the vertical dimension by performing initial channel measurements based on the first CSI-RSs. For example, by making initial channel measurements based on the first CSI-RSs, the mobile station can acquire the precoding matrix indicator (PMI) for the vertical dimension as first CSI feedback.

Figure 3:
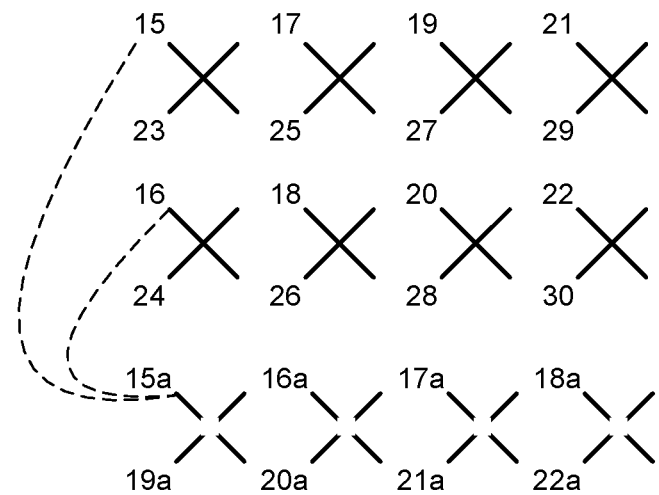
FIG. 3 is a schematic diagram to show how a base station applies beamforming to antenna ports, according to one aspect of the present invention.

In step S102, the mobile station can perform beamforming on the antenna ports 15 to 30 based on the precoding matrix indicator (PMI) for the vertical dimension in the first CSI feedback. FIG. 3 is a schematic diagram to show how a base station 200 applies beamforming to antenna ports 15 to 30, according to one example of the present invention. As shown in FIG. 3, the base station 200 identifies the mapping weights based on the first CSI feedback, maps antenna ports 15 and 16 to a second antenna port 15a, maps antenna ports 17 and 18 to a second antenna port 16a, maps antenna ports 19 and 20 to a second antenna port 17a, and, based on a similar scheme, maps antenna ports 21 to 30 to second antenna ports 18a to 22a, respectively. Upon this mapping, the base station can configure the mapping weights for the two antenna ports integrated in a single second antenna port to be the same as the mapping weights for the antenna ports 15 and 16. Accordingly, the base station 200 performs beamforming on a sixteen-port array based on the first CSI feedback and forms a simplified eight-port array.

In step S103, second CSI-RSs can be transmitted using the simplified antenna port array (that is, second antenna ports 15a to 22a). The mobile station can measure channel states in the horizontal dimension based on the second CSI-RSs, and generate second CSI feedback. In step S104, based on the second CSI feedback received from the mobile station, the base station can finally determine the beam to use for the mobile station.

According to a second example of the present invention, part of the un-precoded antenna ports may be a number of ports located in different spatial dimensions. In step S101, first CSI-RSs can be transmitted to the mobile station using some of the antenna ports that are not precoded. The mobile station makes initial channel measurements based on the first CSI-RSs transmitted from a plurality of ports in different spatial dimensions, so that initial channel states in different spatial dimensions can be identified to generate the first CSI feedback. In step S102, based on the first CSI feedback, it is possible to apply beamforming to all of the antenna ports that are not precoded and that are used for CSI measurements, so that un-precoded antenna ports are mapped to second antenna ports, and a simplified antenna port array is formed. In this example, the first CSI feedback can specify multiple mapping weight sets, which the mobile station has acquired by making initial channel measurements in different spatial dimensions. Accordingly, each of the second antenna ports can be assigned a different mapping weight set among a plurality of mapping weight sets. For each second antenna port, a mapping weight can be obtained from the mapping weight set corresponding to the second antenna port. In step S103, the second CSI-RSs can be transmitted via a simplified antenna port array (that is, second antenna ports). The mobile station can measure each beam's channel state based on the second CSI-RSs, and select beams, and, furthermore, transmit second CSI feedback to the base station. The mobile station generates second CSI feedback. In step S104, the base station can finally determine the beam to use for the mobile station based on the second feedback received from the mobile station.

For example, referring back to FIG. 2, in step S101, first CSI-RSs can be transmitted to the mobile station via the ports 15, 16, 19 and 20. As shown in FIG. 2, the ports 15, 16, 19 and 20 constitute a two-dimensional antenna array in the horizontal dimension x and the vertical dimension y. The mobile station can acquire initial channel states in two spatial dimensions—namely, the horizontal and vertical dimensions—and generate two-dimensional channel state indicator parameters by performing initial channel measurements based on the first CSI-RSs. For example, a two-dimensional precoding matrix indicator (PMI) is generated as first CSI feedback.

Figure 4:
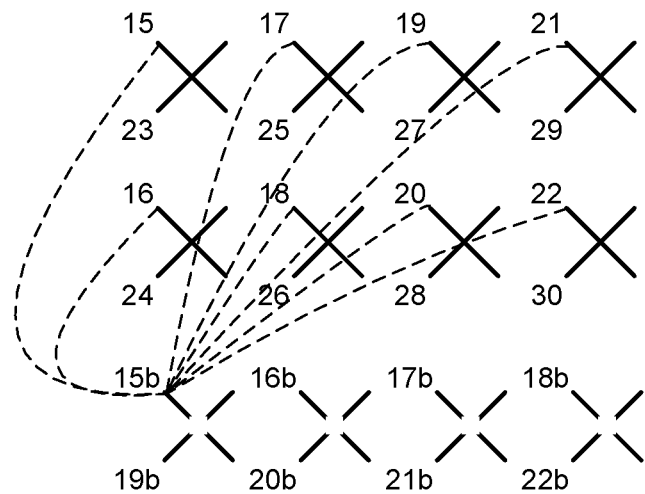
FIG. 4 is a schematic diagram to show how a base station applies beamforming to antenna ports, according to another aspect of the present invention.

In step S102, the mobile station can perform beamforming on the antenna ports 15 to 30 based on the precoding matrix indicator (PMI) for the vertical dimension in the first CSI feedback. FIG. 4 is a schematic diagram to show how a base station 200 applies beamforming to antenna ports 15 to 30, according to another example of the present invention. As shown in FIG. 4, the base station 200 can specify the first mapping weight set based on the first CSI feedback, and, based on weights in the first mapping weight set, map the antenna ports 15 to 22 to the second antenna port 15b and map the antenna ports 23 to 30 to the second antenna port 19b. Furthermore, the base station 200 can specify a second mapping weight set based on the first CSI feedback, and, based on weights in the second mapping weight set, map the antenna ports 15 to 22 to the second antenna port 16b, and map the antenna ports 23 to 30 to the second antenna port 20b. Furthermore, the base station 200 can specify a third mapping weight set based on the first CSI feedback, and, based on weights in the third mapping weight set, map the antenna ports 15 to 22 to the second antenna port 17b, and map the antenna ports 23 to 30 to the second antenna port 21b. Furthermore, the base station 200 can specify a fourth mapping weight set based on the first CSI feedback, and, based on weights in the fourth mapping weight set, map the antenna ports 15 to 22 to the second antenna port 18b and map the antenna ports 23 to 30 to the second antenna port 22b. Accordingly, the base station 200 performs beamforming on a sixteen-antenna array based on the first CSI feedback, and forms a simplified eight-antenna port array.

In step S103, the second CSI-RS can be transmitted using a simplified antenna port array (that is, second antenna ports 15b to 22b). The mobile station can measure each beam's channel state and select beams, based on the second CSI-RSs, thereby generating second CSI feedback. In step S104, based on the second CSI feedback received from the mobile station, the base station can finally determine the beam to use for the mobile station.

Figure 5:
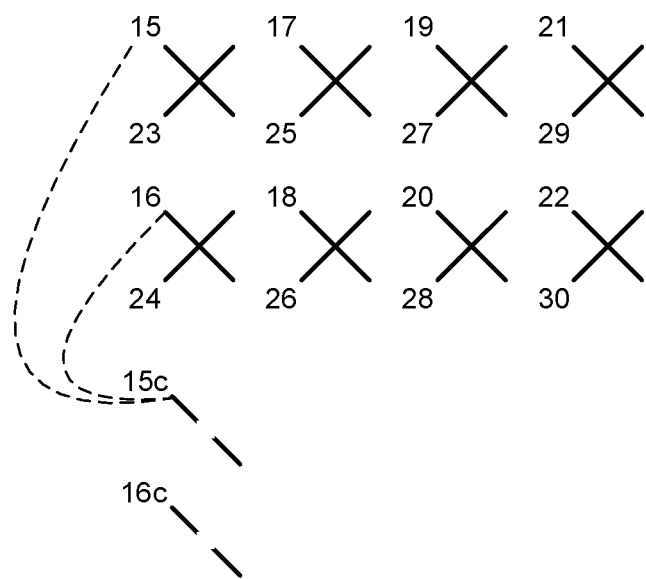
FIG. 5 is a schematic diagram to show how a base station applies initial beamforming to antenna ports, according to one aspect of the present invention.

According to a third example of the present invention, the base station can perform initial beamforming on part of the un-precoded antenna ports and form first antenna ports. Here, the first antenna ports may be a number of ports located in the same spatial dimension. FIG. 5 is a schematic diagram to show how the base station 200 applies initial beamforming to the antenna ports 15 to 30, according to one example of the present invention. As shown in FIG. 5, the base station 200 maps part of the antenna ports 15 to 30 to first antenna ports 15c and 16c, which are arranged along the vertical dimension. The ports 15 and 16 form the first antenna ports 15c and 16c by way of mapping. The weights assigned to the ports 15 and 16 to form the first antenna port 15c may be different from the weights assigned to the ports 15 and 16 to form the first antenna port 16c. In step S101, first CSI-RSs can be transmitted to the mobile station via a number of ports that are located in the same spatial dimension and that have been subjected to initial beamforming. Steps S102 to S104 of the present example are similar to steps S102 to S104 executed in the first example, so their explanation will be omitted here.

Figure 6:
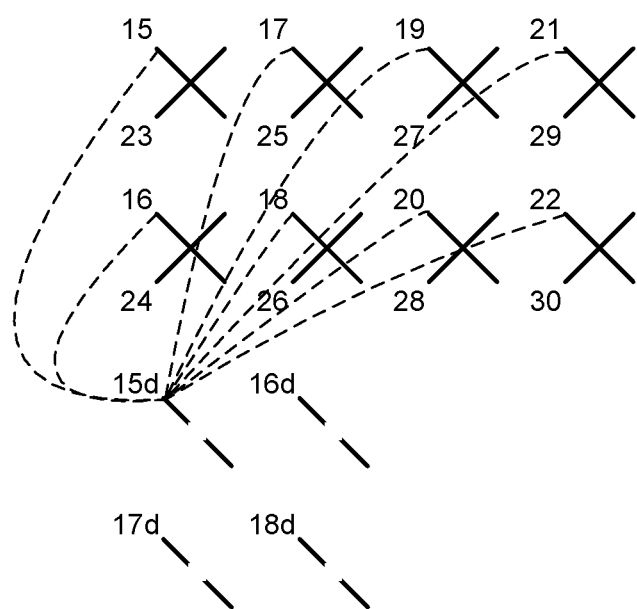
FIG. 6 is a schematic diagram to show how a base station applies initial beamforming to antenna ports, according to another aspect of the present invention.

According to a fourth example of the present invention, the base station can perform initial beamforming on part of the un-precoded antenna ports and form first antenna ports. Here, the first antenna ports may be a number of ports located in different spatial dimensions. FIG. 6 is a diagram to show how the base station 200 applies initial beamforming to the antenna ports 15 to 30, according to another example of the present invention. As shown in FIG. 6, the base station 200 maps part of the antenna ports 15 to 30 to first antenna ports 15c to 18d, which are arranged along the vertical dimension. For example, the base station 200 can form the first antenna ports 15d to 18d with the ports 15 to 22. In step S101, the first CSI-RS may be transmitted to the mobile station via a number of ports that are located in different spatial dimensions and that have been subjected to initial beamforming. Steps S102 to S104 of the present example are similar to steps S102 to S104 executed in the second example, so their explanation will be omitted here.

Also, according to another example of the present invention, part of the information in un-precoded CSI feedback (that is, the above-mentioned CSI report of class A) may serve as first CSI feedback. To be more specific, the CSI report of class A includes information such as a precoding matrix indicator (PMI), a rank indicator (RI), a channel quality indicator (CQI) and so on. The first CSI feedback may include a PMI alone, or may include a PMI and an RI, without including a CQI. Alternatively, part of the information in CSI feedback that has been subjected to beamforming (that is, the above-mentioned CSI report of class B) may serve as first CSI feedback. To be more specific, the CSI report of class B includes information such as a channel resource indicator (CRI), a precoding matrix indicator (PMI), a rank indicator (RI), a channel quality indicator (CQI) and so on. The first CSI feedback may include only a channel resource indicator (CRI). The method shown in FIG. 1 may further include the step of reporting the type of the first CSI feedback to the mobile station.

According to another example of the present invention, in step S102, the first codeword is selected from the first codebook based on the first CSI feedback received, and beamforming is executed based on this first codeword, so that second antenna ports that have been subjected to beamforming can be formed. The first codebook may be an existing beam selection codebook. Alternatively, the first codebook may be a codebook that is generated based on an existing beam selection codebook. For example, it is possible to generate the first codebook by selecting some of the codewords in a beam selection codebook. Furthermore, for example, the first codebook can be generated by changing the parameters of an existing codebook—for example, information about the dimension of the codebook, the number of ports in the vertical dimension, or the number of ports in the horizontal dimension. Furthermore, for example, a new codebook can be prepared. Here, the precoding matrix contained in this codebook is each codeword in an existing beam selection codebook—that is, part of the precoding matrix. For example, where an existing beam selection codebook is suitable for a dual polarized wave antenna array, a codebook that is suitable for a single polarized wave antenna array can be prepared by extracting part of the beam selection codebook.

Alternatively, the base station can store a plurality of candidate codebooks in advance. The first CSI feedback may contain a codebook indicator and a codeword indicator. In step S102, the first codebook is specified out of a plurality of candidate codebooks based on the codebook indicator, and the first codeword can be selected from the first codebook based on the codeword indicator.

In the channel state information reference signal (CSI-RS) transmission method according to the above-described embodiments of the present invention, CSI-RSs are transmitted based on a multi-step scheme. To be more specific, first CSI-RSs are transmitted using a smaller number of first antenna ports, and, furthermore, a simplified antenna port array is formed based on first CSI feedback, thereby providing second antenna ports. Next, second CSI-RSs are transmitted by the simplified antenna ports (that is, second antenna ports), and, finally, the beam to use to communicate data to the mobile station is selected based on second CSI feedback. This allows the radio communication system to minimize the increase in control signaling overhead as much as possible, and to support the use of massive MIMO or FD-MIMO.

Figure 7:
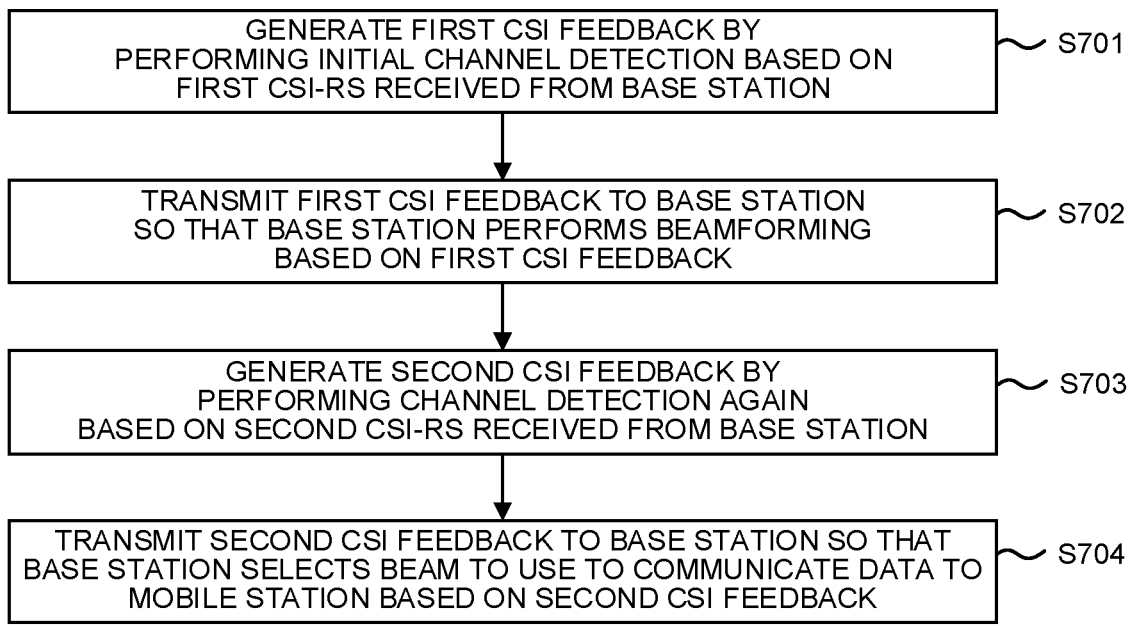
FIG. 7 is a flowchart to show a channel state information (CSI) feedback method 700.

Now, with reference to FIG. 7, a method of feeding back channel state information (CSI), executed by a mobile station according to an embodiment of the present invention, will be described below. FIG. 7 is a flowchart to show a CSI feedback method 700. The CSI feedback method 700 corresponds to the channel state information reference signal (CSI-RS) transmission method shown in FIG. 7.

As shown in FIG. 7, in step S 701, initial channel detection is performed based on first CSI-RSs, which are received from a base station and which relate to first antenna ports of the base station, and first CSI feedback is generated. As described above, the first antenna ports may be part of the antenna ports of the base station that are not precoded. Accordingly, part of the information in un-precoded CSI feedback (that is, the above-mentioned CSI report of class A) may serve as first CSI feedback. To be more specific, the CSI report of class A includes information such as a precoding matrix indicator (PMI), a rank indicator (RI), a channel quality indicator (CQI) and so on. The first CSI feedback may include a PMI alone, or may include a PMI and an RI, without including a CQI. For example, in the first example shown in FIG. 3 above, the first CSI feedback may be the PMI in the vertical dimension. Furthermore, for example, in the first example shown in FIG. 4, the first CSI feedback may be the PMIs in two dimensions—namely, the horizontal dimension and the vertical dimension.

Also, the first antenna ports may be part of the antenna ports of the base station where initial beamforming has taken place. Accordingly, part of the information in CSI feedback that has been subjected to beamforming (that is, the above-mentioned CSI report of class B) may serve as first CSI feedback. To be more specific, the CSI report of class B includes information such as a channel resource indicator (CRI), a precoding matrix indicator (PMI), a rank indicator (RI), a channel quality indicator (CQI) and so on. The first CSI feedback may include only a channel resource indicator (CRI). For example, in the examples shown in FIG. 5 and FIG. 6, the first CSI feedback may be a channel resource indicator (CRI), which indicates the result of beam selection by the mobile station. In step S 702, the first CSI feedback is transmitted to the base station, so that the base station can execute beamforming based on the first CSI feedback and form second antenna ports that have been subjected to beamforming. When the base station reports the type of the first CSI feedback to the mobile station, the mobile station can send feedback based on the feedback type reported from the base station.

Next, in step S 703, channel detection is performed again based on second CSI-RSs, which are received from the base station and which relate to second antenna ports, and second CSI feedback is generated. The second CSI feedback may be CSI feedback information that is not precoded (that is, the above-mentioned class-A CSI report), or may be CSI feedback information that has been subjected to beamforming (that is, the above-mentioned class-B CSI report). Finally, the mobile station transmits the second feedback to the base station, so that the base station can select the beam to use to communicate data to the mobile station based on the second CSI feedback.

The base station may request the mobile station to send only the first CSI feedback or only the second CSI feedback, as needed. Also, the base station may request the mobile station to send the first CSI feedback and the second CSI feedback together, as needed. In this case, according to an example of the present invention, the base station can transmit feedback command information to the mobile station to report to the mobile station which CSI feedback is needed. Accordingly, for example, the mobile station can send only the first CSI feedback based on the report. Likewise, based on the report, the mobile station can send the second CSI feedback alone. Alternatively, the mobile station can send the first CSI feedback and the second CSI feedback at the same time, based on the report. Also, in the feedback process, depending on the configuration of the base station, if the mobile station needs to send the first CSI feedback and the second CSI feedback in the same resources, and yet these resources are insufficient to support the simultaneous delivery of the first CSI feedback and the second CSI feedback, preferably, the mobile station sends the first CSI feedback preferentially.

Also, in the feedback process, it is preferable to feed back the first CSI resource using resources with good channel quality. For example, the feedback resource for the PMI in the first CSI feedback may be the same as the feedback resource for the RI, or they may be adjacent resources.

In the CSI feedback method according to the above-described embodiment of the present invention, CSI is fed back based on a multi-step scheme. To be more specific, first CSI feedback is generated based on first CSI-RSs that are transmitted by a smaller number of first antenna ports. Following this, second feedback is generated based on second CSI-RSs that are transmitted by simplified antenna ports (that is, second antenna ports). This allows the radio communication system to minimize the increase in control signaling overhead as much as possible, and to support the use of massive MIMO or FD-MIMO.

Figure 8:
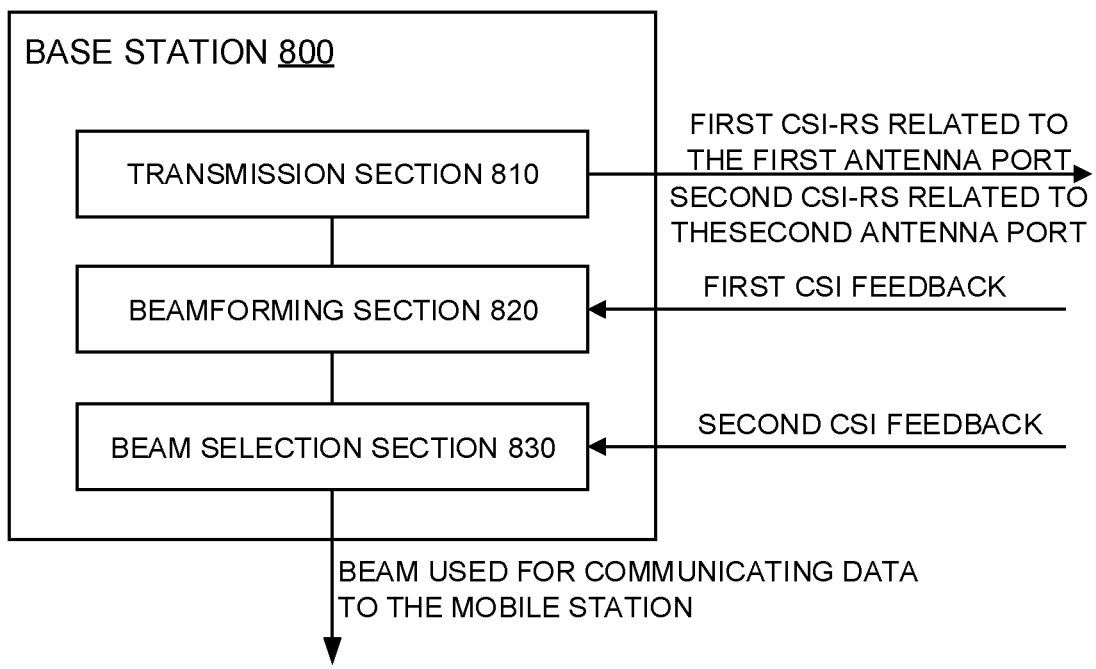
FIG. 8 is a block diagram to show a base station according to an embodiment of the present invention.

Now, a mobile station according to an embodiment of the present invention will be described below with reference to FIG. 8. FIG. 8 is a block diagram of a base station 800 according to an embodiment of the present invention. As shown in FIG. 8, the base station 800 includes a transmission section 810, a beamforming section 820 and a beam selection section 830. In addition to the three sections, the base station 800 may further include other components. However, since these components are not related to the contents of the embodiment of the present invention, illustration and description thereof will be omitted here. Furthermore, since the specific details of the following operations performed by the base station 800 according to the embodiment of the present invention are similar to the details described earlier with reference to FIG. 1 to FIG. 6, here, in order to avoid duplication, redundant description of the same details will be omitted.

Transmission section 810 transmits first CSI-RSs related to first antenna port of the base station to the mobile station. The first antenna ports may be part of the antenna ports that are un-precoded and used for CSI measurements, or may be ports that have been subjected to beamforming, which are provided by applying beamforming to part of the ports that are un-precoded and used for CSI measurements. In other words, in step S810, CSI-RSs related to part of the antenna ports is transmitted to a mobile station, so that the mobile station performs initial channel measurements based on the CSI-RSs of these partial antenna ports and transmits first CSI feedback to the base station to show the initial channel measurement results.

The beamforming section 820 performs beamforming based on the first CSI feedback received from the mobile station, and forms second antenna ports that have been subjected to beamforming. As mentioned earlier, the first CSI feedback shows the results of the initial measurements of channel states in the mobile station. For example, the first CSI feedback may include selecting an initial precoding matrix (that is, a precoding matrix indicator (PMI)) or selecting an initial beam (that is, a channel resource indicator (CRI)), determined by the mobile station based on the first CSI-RSs.

After receiving the first CSI feedback, the beamforming section 820, performs beamforming for all of its antenna ports that are not precoded and that are used for CSI measurements, on an as-needed basis, based on the first CSI feedback, so that a simplified antenna port array is provided. To be more specific, the beamforming section 820 can map a number of un-precoded ports to one port. Here, the percentage of un-precoded ports in the mapping ports can be specified by the first CSI feedback. For example, in the beamforming process, each un-precoded port's mapping weight can be derived based on the first CSI feedback received. Then, based on these mapping weights, multiple un-precoded antenna ports may be mapped to a single second antenna port.

Furthermore, according to an example of the present invention, the base station can store a plurality of sets of mapping weight in advance. The beamforming section 820 can first specify a set of mapping weights based on the first CSI feedback received. Then, mapping weights are picked up from the mapping weight set. For example, the base station can pick a particular set of mapping weights from the weight set that is stored based on the first CSI feedback received, and, when the base station forms each second antenna port, the base station can use the mapping weights obtained from this mapping weight set together. Also, for example, the beamforming section 820 can pick a number of specific mapping weight sets from the weight sets that are stored, based on the first CSI feedback received, and assign a different set to each second antenna port, amongst the plurality of specific mapping weight sets. When the base station forms each second antenna port, the base station can use mapping weights selected from the mapping weight set assigned to this port.

Next, the transmission section 810 transmits second CSI-RSs, which relate to second antenna ports, to the mobile station. In other words, second CSI-RSs are transmitted to the mobile station via a simplified antenna port array where beamforming has been performed. Finally, based on second CSI feedback received from the mobile station, the beam selection section 830 can finally select the beam to use when communicating data to the mobile station.

To be more specific, in the first example described above with reference to FIG. 3, the first antenna ports may be part of the antenna ports of the base station that are not precoded. Furthermore, part of the ports among the un-precoded antenna ports may be a number of ports located in the same spatial dimension. The transmission section 810 can transmit the first CSI-RSs to the mobile station using part of the antenna ports that are not precoded. The mobile station performs initial channel measurements based on the first CSI-RSs that are transmitted from a plurality of ports that are provided in the same spatial dimension, so that the mobile station can identify the channel states in this spatial dimension and generate first CSI feedback. Based on the first CSI feedback, the beamforming section 820 can apply beamforming to all of the antenna ports that are not precoded and that are used for CSI measurements, so that un-precoded antenna ports are mapped to second antenna ports, and a simplified antenna port array is formed. When forming each second antenna port, mapping weights that are picked from the same mapping weight set can be used. Then, the transmission section 810 can transmit second CSI-RSs via a simplified antenna port array (that is, second antenna port). The mobile station can generate second CSI feedback by measuring channel states in a different spatial dimension than the initial channel measurements, based on the second CSI-RSs. Based on the second CSI feedback received from the mobile station, the beam selection section 830 can finally determine the beam to use to communicate data to the mobile station.

Also, in the second example described above with reference to FIG. 4, part of the un-precoded antenna ports may be a number of ports located in different spatial dimensions. The transmission section 810 can transmit the first CSI-RSs to the mobile station using part of the antenna ports that are not precoded. The mobile station makes initial channel measurements based on the first CSI-RSs transmitted from a plurality of ports in different spatial dimensions, so that initial channel states in different spatial dimensions can be identified to generate the first CSI feedback. Based on the first CSI feedback, the beamforming section 820 can apply beamforming to all of the antenna ports that are not precoded and that are used for CSI measurements, so that un-precoded antenna ports are mapped to second antenna ports, and a simplified antenna port array is formed. In this example, the first CSI feedback can specify multiple mapping weight sets which the mobile station has acquired by making initial channel measurements in different spatial dimensions. Accordingly, each of the second antenna ports can be assigned a different mapping weight set among a plurality of mapping weight sets. For each second antenna port, a mapping weight can be obtained from the mapping weight set corresponding to the second antenna port. The transmission section 810 can transmit a second CSI-RS via a simplified antenna port array (that is, second antenna ports). The mobile station can measure each beam's channel state based on the second CSI-RSs, and select beams, and, furthermore, transmit second CSI feedback to the base station. The mobile station generates second CSI feedback. In step S104, based on the second CSI feedback received from the mobile station, the beam selection section 830 can finally determine the beam to use for the mobile station.

Furthermore, in the third and fourth examples described above with reference to FIG. 5 and FIG. 6, the beamforming section 820 may first perform initial beamforming on part of un-precoded antenna ports and form first antenna ports. Here, the first antenna ports may be a number of ports located in the same or different spatial dimensions. The transmission section 810 then transmits the first CSI-RSs using the first antenna ports.

Also, according to another example of the present invention, the transmission section 810 may further report the type of the first CSI feedback to the mobile station.

According to another example of the present invention, in the beamforming section 820, the first codeword is selected from the first codebook based on the first CSI feedback received, and beamforming is executed based on the first codeword, so that second antenna ports that have been subjected to beamforming can be formed. The first codebook may be an existing beam selection codebook. Alternatively, the first codebook may be a codebook that is generated based on an existing beam selection codebook. For example, it is possible to generate the first codebook by selecting some codewords in a beam selection codebook. Furthermore, for example, the first codebook can be generated by changing the parameters of an existing codebook—for example, information about the dimension of the codebook, the number of ports in the vertical dimension, or the number of ports in the horizontal dimension. Furthermore, for example, a new codebook can be prepared. Here, the precoding matrix contained in this codebook is each codeword in an existing beam selection codebook—that is, part of the precoding matrix. For example, where an existing beam selection codebook is suitable for a dual polarized wave antenna array, a codebook that is suitable for a single polarized wave antenna array can be prepared by extracting part of the beam selection codebook.

Alternatively, the base station can store a plurality of candidate codebooks in advance. The first CSI feedback includes a codebook indicator and a codeword indicator. The beamforming section 820 can specify the first codebook from a plurality of candidate codebooks based on the codebook indicator, and select the first codeword from the first codebook based on the codeword indicator.

In the base station according to the above-described embodiment of the present invention, CSI-RSs are transmitted based on a multi-step scheme. To be more specific, first CSI-RSs are transmitted using a smaller number of first antenna ports, and, furthermore, a simplified antenna port array is formed based on first CSI feedback, thereby providing second antenna ports. Next, second CSI-RSs are transmitted by the simplified antenna ports (that is, second antenna ports), and, finally, the beam to use to communicate data to the mobile station is selected based on second CSI feedback. This allows the radio communication system to minimize the increase in control signaling overhead as much as possible, and to support the use of massive MIMO or FD-MIMO.

Figure 9:
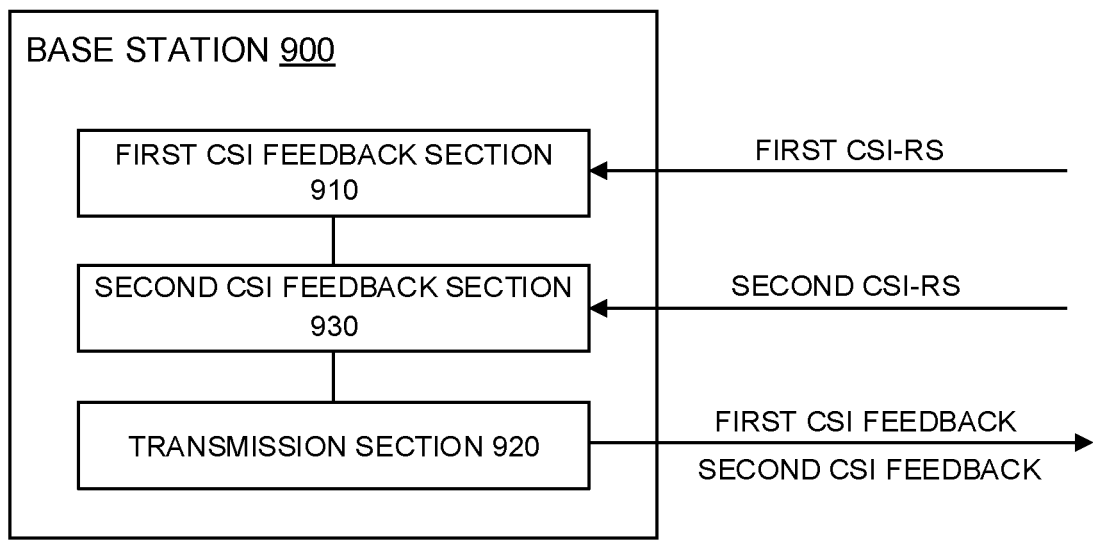
FIG. 9 is a block diagram to show a mobile station according to an embodiment of the present invention.

According to an embodiment of the present invention, it is possible to apply corresponding configurations to the mobile station based on the configurations of the base station. FIG. 9 is a block diagram to show a mobile station 900 according to an embodiment of the present invention. As shown in FIG. 9, the mobile station 900 includes a first CSI feedback section 910, a transmission section 920, and a second CSI feedback section 930. In addition to the three sections, the mobile station 900 may further include other components. However, since these components are not related to the contents of the embodiment of the present invention, illustration and description thereof will be omitted here. Furthermore, since the specific details of the following operations performed by the mobile station 900 according to the embodiment of the present invention are similar to the details described earlier with reference to FIG. 7, here, in order to avoid duplication, redundant description of the same details will be omitted.

In the first feedback section 910, initial channel detection is performed based on first CSI-RSs, which are received from a base station and which relate to first antenna ports of the base station, and first CSI feedback is generated. As described above, the first antenna ports may be part of the antenna ports of the base station that are not precoded. Accordingly, the first CSI feedback may be part of the information in the un-precoded CSI feedback (that is, the CSI report of class A above). To be more specific, the CSI report of class A includes information such as a precoding matrix indicator (PMI), a rank indicator (RI), a channel quality indicator (CQI) and so on. The first CSI feedback may include a PMI alone, or may include a PMI and an RI, without including a CQI. For example, in the first example shown in FIG. 3 above, the first CSI feedback may be the PMI in the vertical dimension. Furthermore, for example, in the first example shown in FIG. 4, the first CSI feedback may be the PMIs in two dimensions—namely, the horizontal dimension and the vertical dimension.

Also, the first antenna ports may be part of the antenna ports of the base station where initial beamforming has taken place. Accordingly, part of the information in CSI feedback that has been subjected to beamforming (that is, the above-mentioned CSI report of class B) may serve as first CSI feedback. To be more specific, the CSI report of class B includes information such as a channel resource indicator (CRI), a precoding matrix indicator (PMI), a rank indicator (RI), a channel quality indicator (CQI) and so on. The first CSI feedback may include only a channel resource indicator (CRI). For example, in the examples shown in FIG. 5 and FIG. 6, the first CSI feedback may be a channel resource indicator (CRI), which indicates the result of beam selection by the mobile station.

The transmission section 920 transmits the first CSI feedback to the base station, so that the base station can perform beamforming based on the first CSI feedback and form second antenna ports that have been subjected to beamforming. When the base station reports the type of the first CSI feedback to the mobile station, the transmission section 920 can send feedback based on the feedback type reported from the base station.

Next, in the second feedback section 930, initial channel detection is performed again based on the first CSI-RSs that are received from the base station and that relate to the first antenna ports of the base station, and second CSI feedback is generated. The second CSI feedback may be CSI feedback information that is not precoded (that is, the above-mentioned class-A CSI report), or may be CSI feedback information that has been subjected to beamforming (that is, the above-mentioned class-B CSI report). Finally, the transmission section 920 transmits second feedback to the base station, so that the base station can select the beam to use to communicate data to the mobile station based on the second CSI feedback.

The base station may request the mobile station to send only the first CSI feedback or only the second CSI feedback, as needed. Also, the base station may request the mobile station to send the first CSI feedback and the second CSI feedback together, as needed. In this case, according to an example of the present invention, the base station can transmit feedback command information to the mobile station to report to the mobile station which CSI feedback is needed. Accordingly, for example, the mobile station can send only the first CSI feedback based on the report. The mobile station can transmit only the second CSI feedback using the report. Alternatively, the mobile station can send the first CSI feedback and the second CSI feedback at the same time using the report. Also, in the feedback process, depending on the configuration of the base station, if the mobile station needs to send the first CSI feedback and the second CSI feedback in the same resources, and yet these resources are insufficient to support the simultaneous delivery of the first CSI feedback and the second CSI feedback, preferably, the mobile station sends the first CSI feedback preferentially.

Also, in the feedback process, it is preferable to feed back the first CSI resource using resources with good channel quality. For example, the feedback resource for the PMI in the first CSI feedback may be the same as the feedback resource for the RI, or they may be adjacent resources.

In the mobile station according to the above-described embodiment of the present invention, CSI is fed back based on a multi-step scheme. To be more specific, first CSI feedback is generated based on first CSI-RSs that are transmitted by a smaller number of first antenna ports. Following this, second feedback is generated based on second CSI-RSs that are transmitted by simplified antenna ports (that is, second antenna ports). This allows the radio communication system to minimize the increase in control signaling overhead as much as possible, and to support the use of massive MIMO or FD-MIMO.

The operations of the base station 800 and the mobile station 900 described above can be executed by hardware or a software module executed on a processor, or a combination of both.

The software module may be installed in any type of storage medium, such as a RAM (Random Access Memory), a flash memory, a ROM (Read Only Memory), an EPROM (Erasable Programmable Read Only Memory), an EEPROM (Electrically Erasable Programmable Read Only Memory), a register, a hard drive, a removable disk, and a CD-ROM.

Such a storage medium is coupled to the processor such that the processor can write information to the storage medium and read information from the storage medium. Such a storage medium may be integrated in a processor. These storage medium and processor may be arranged in an ASIC. Such an ASIC may be arranged in the base station 800 and the mobile station 900. Such storage medium and processor may be located in the base station 800 and the mobile station 900 as discrete components. For example, the processor can perform the operations performed by the beamforming section and the beam selection section at the base station as described above. Also, for example, it is possible to carry out the operations performed by the processor by the first CSI feedback section and the second CSI feedback section in the mobile station as described above.

Accordingly, while the present invention has been described in detail with reference to the above-described embodiments, those skilled in the art will appreciate that the present invention is not limited to the embodiments described herein. The present invention can be realized as modifications or alterations without departing from the scope of the invention as defined in the claims. Therefore, the description in the specification is merely an explanation of the example, and it does not have any restrictive meaning to the present invention.

The invention claimed is:

1. A terminal comprising:
    a processor that performs channel measurement based on a first Channel State Information-Reference Signal (CSI-RS) and performs channel measurement based on a second CSI-RS; and
    a transmission section that transmits a first Channel State Information (CSI) feedback based on the first CSI-RS and a second CSI feedback based on the second CSI-RS,
    wherein when the first CSI-RS is an un-precoded CSI-RS, the first CSI feedback includes only a part of information of CSI feedback based on the un-precoded CSI-RS and the part of information includes the PMI and a rank indicator (RI) without including a channel quality indicator,
    wherein the second CSI feedback is CSI feedback information based on a beamformed CSI-RS, and
    wherein when transmitting the first CSI feedback and the second CSI feedback simultaneously, the transmission section performs the first CSI feedback preferentially.

2. The terminal according to claim 1, wherein when the first CSI-RS is a part of beamformed CSI-RS, the first CSI feedback only includes a part of information of CSI feedback based on the beamformed CSI-RS that is a channel resource indicator (CRI).

3. The terminal according to claim 1, wherein when there is not enough resource to support simultaneous transmission of the first CSI feedback and the second CSI feedback, the transmission section performs the first CSI feedback preferentially.

4. A Channel State Information (CSI) feedback method for a terminal, comprising:
    performing channel measurement based on a first Channel State Information-Reference Signal (CSI-RS) and performing channel measurement based on a second CSI-RS; and
    transmitting a first CSI feedback based on the first CSI-RS and a second CSI feedback based on the second CSI-RS,
    wherein when the first CSI-RS is an un-precoded CSI-RS, the first CSI feedback includes only a part of information of CSI feedback based on the un-precoded CSI-RS and the part of information includes the PMI and a rank indicator (RI) without including a channel quality indicator,
    wherein the second CSI feedback is CSI feedback information based on a beamformed CSI-RS, and
    wherein when transmitting the first CSI feedback and the second CSI feedback simultaneously, performing the first CSI feedback preferentially.

5. A base station comprising:
    a transmission section that transmits a first Channel State Information-Reference Signal (CSI-RS) and a second CSI-RS;
    a receiving section that receives a first Channel State Information (CSI) feedback based on the first CSI-RS and a second CSI feedback based on the second CSI-RS,
    wherein when the first CSI-RS is an un-precoded CSI-RS, the first CSI feedback includes only a part of information of CSI feedback based on the un-precoded CSI-RS and the part of information includes the PMI and a rank indicator (RI) without including a channel quality indicator,
    wherein the second CSI feedback is CSI feedback information based on a beamformed CSI-RS, and
    wherein the receiving section receives the first CSI feedback performed preferentially when the first CSI feedback and the second CSI feedback is simultaneously transmitted.

6. A system comprising:
    a terminal that comprises:
        a processor that performs channel measurement based on a first Channel State Information-Reference Signal (CSI-RS) and performs channel measurement based on a second CSI-RS; and
        a transmission section that transmits a first Channel State Information (CSI) feedback based on the first CSI-RS and a second CSI feedback based on the second CSI-RS,
        wherein when the first CSI-RS is an un-precoded CSI-RS, the first CSI feedback includes only a part of information of CSI feedback based on the un-precoded CSI-RS and the part of information includes the PMI and a rank indicator (RI) without including a channel quality indicator, wherein the second CSI feedback is CSI feedback information based on a beamformed CSI-RS, and wherein when transmitting the first CSI feedback and the second CSI feedback simultaneously, the transmission section performs the first CSI feedback preferentially; and a base station that comprises:
   a transmission section that transmits the first CSI-RS and the second CSI-RS; and
   a receiving section that receives the first CSI feedback and the second CSI feedback.

\* \* \* \* \*